United States Patent [19]

Jones

[11] Patent Number: 4,832,448
[45] Date of Patent: May 23, 1989

[54] INTERFERENCE FILTER

[75] Inventor: David P. Jones, St. Asaph, North Wales, United Kingdom

[73] Assignee: Pilkington P.E. Limited, United Kingdom

[21] Appl. No.: 102,392

[22] Filed: Sep. 29, 1987

[30] Foreign Application Priority Data

Oct. 10, 1986 [GB] United Kingdom ............... 86 24394

[51] Int. Cl.$^4$ ............................ G02B 5/28; G02B 1/10
[52] U.S. Cl. ..................................... 350/166; 350/1.6; 350/165
[58] Field of Search ......................... 350/165, 166, 1.6

[56] References Cited

U.S. PATENT DOCUMENTS

| 2,259,395 | 10/1941 | Sachtleben | 350/165 |
| 3,432,225 | 3/1969 | Rock | 350/164 |
| 3,565,509 | 2/1971 | Sulzbach | 350/164 |
| 4,229,066 | 10/1980 | Rancourt et al. | 350/1.6 |

FOREIGN PATENT DOCUMENTS 1428608 2/1974 United Kingdom .
2065913 9/1980 United Kingdom .

Primary Examiner—John K. Corbin
Assistant Examiner—David J. Edmondson
Attorney, Agent, or Firm—F. Eugene Davis, IV

[57] ABSTRACT

An interference filter, also referred to as a notch filter, of the type which reflects a certain wavelength range while letting pass over wavelengths bands of a range is disclosed. The filter is designed for operation in the visual and infra-red regions of the electromagnetic spectrum and in the disclosure the uniform layer pairs of material are such that the optical thickness of each layer of the or each layer pair deposited on a plane light-transmitting substrate is a non quarter-wave unequal thickness with respect to its complementary layer. Each layer pair has an overall optical thickness adding up to in total a half-wave thickness. The technique of degrading a standard quarter wavelength layer is also employed on a curved surface substrate with non-uniform layers, where one layer of a layer pair increases from the center to the periphery of the substrate and the other layer of the pair decreases from the center to the periphery of the substrate; a half-wave optical thickness being maintained throughout the layer pair.

17 Claims, 4 Drawing Sheets

INTERFERENCE FILTER

BACKGROUND OF THE INVENTION

This invention relates to an interference filter of the type reflecting a certain wavelength band within a given wavelength range while letting pass other wavelength bands of the range.

Conventional interference filters of the above type are generally comprised of a plane surfaced substrate, such as glass, upon which has been deposited by e.g. vacuum deposition a plurality of alternate high and low refractive index thin uniform layers where each layer is arranged in a quarter-wave thickness or an odd multiple of a quarter-wave, at the chosen wavelength which is required to be reflected. Reflection efficiency and band width of the reflection zone are controlled by the ratio of the index of refraction of each high-low index layer pair. The efficiency of reflection can be increased by increasing the number of layer pairs.

Such conventional quarter-wave designs are in theory capable of providing narrow band reflection at specified points anywhere within a wide spectral range but in practice there is a limit to the choice of materials available for any particular wavelength band which it is required to reflect. Whilst in some parts of the electromagnetic spectrum there is a wide choice of materials available, in other parts, such as in the infra-red region, there are only a very limited number of materials available. This can make the construction of narrow band reflection filters difficult and in some cases impractical.

It is an object of the present invention to provide an interference filter for narrow band reflection in which the aforementioned disadvantages are obviated.

SUMMARY OF THE INVENTION

The principle of the design technique used in accordance with the invention, as hereafter defined, is to degrade the quarter-wave optical thicknesses of each layer pair in the interference filter, but in such a way that the total thickness remains equal to a half-wave optical thickness or multiple thereof. This ensures that the maximum peak of reflection is maintained at the desired reference wavelength. Although it would be expected in such circumstances that small changes to the thicknesses of each layer pair would not seriously degrade the overall optical characteristic of the filter, surprisingly it has also been found that very substantial changes (which would be necessary to produce extremely narrow band reflection spikes of the order of 1% of the reference wavelength) do not either seriously degrade the overall optical characteristic of the filter. In fact, it has been found that as the thickness of one layer is increased and the other layer decreased from a quarter-wave optical thickness, the band width of the reflection zone and magnitude of the reflectivity at the peak reflection wavelength are simultaneously reduced, but the essential reflection spike characteristic is still maintained.

If a filter is required having a band width of reflectivity of the order of 1% this accordingly requires the thickness of one of the layer pairs to be just less than a half-wave optical thickness, and for the other layer of the layer pair to be extremely thin so as to maintain the total period thickness, i.e. the thickness of the or each layer pair, equal to a half-wave optical thickness or a multiple thereof. In order to increase the peak reflectivity, additional periods (layer pairs) can be introduced until the desired peak reflectivity is achieved. While this technique is discussed in relation to the application of uniform layers on to plane surfaced substrates, the technique is similarly applicable to curved surface substrates.

A potential application of this technique is in the design of multilayer interference filters employed to provide protection from exposure to harmful laser radiation. If the laser operates within the visible wavelength spectrum, or more generally within the sensitivity waveband of the detector being employed, then a notch reflection filter can be used to attenuate the laser radiation whilst maintaining maximum transmission of other useful wavelengths. Very frequently, and particularly in the case of visual applications (e.g. spectacle lenses), the surfaces to which the laser filter must be applied is curved in shape. In addition, it is often found that the angular range over which protection is required is a variable function of position on the curved surface.

In certain applications, it has been found that the angular protection range required is greater towards the periphery of the curved surface than it is at the centre of the lens. In order to cover a wide angular range, a notch filter must of necessity possess a correspondingly wide reflection waveband, since the entire optical characteristic shifts towards shorter wavelengths with increasing incidence angle. This means that if a uniform coating is deposited on the curved surface, the angular protection achieved at the centre of the component will be greater than necessary, in order that adequate protection can be conferred at locations towards the edge of the component. Consequently, the integrated transmission of useful energy through the centre of the lens will be reduced. This problem can be largely overcome by using the design techniques described herein with an arrangement whereby the layer thicknesses of vacuum deposited coatings applied to a curved surface are adjusted from the centre to the periphery of the surface to give the optimum bandwidth corresponding to the required angular coverage in the centre of the component and to give a wider angular coverage towards the periphery of the component. Accordingly, the invention provides an interference filter comprising at least one pair of high and low index of refraction light transmitting layers on a light transmitting substrate, the or each layer pair reflecting at least part of a certain wavelength band within a given wavelength range while transmitting other wavelength bands of the said range, each layer of the or each layer pair being of a non quarter-wave unequal thickness with respect to its complementary layer, and each layer pair having an optical thickness adding up in total to a half-wave thickness.

The design technique employed in accordance with the teaching of the invention thus employs a filter construction whereby the total thickness of the or each layer pair is the same as that of a conventional quarter-wave layer-pair design, but where one layer is of a thickness greater than a quarter-wave, and less than a half-wave optical thickness and the thickness of said other layer is equal to an optical thickness which is required to complete a half-wave when added to the optical thickness of said one layer. Such a design is substantially different from a quarter-wave multi-layer filter design of conventional form and offers several distinct advantages.

Such design techniques may be conveniently employed to an interference filter where one layer of the or each layer pair progressively increases in thickness from the centre to the periphery of the surface of the substrate, whereas the other layer of the or each layer pair progressively decreases in thickness from the centre to the periphery of the surface of the substrate.

Preferably the thickness of said one layer and said other layer at the periphery and the centre respectively of the surface of the substrate is greater than a quarter-wave, and less than a half-wave optical thickness, whereas the thickness of said other layer and said one layer at the periphery and centre respectively of the surface of the substrate is equal to an optical thickness which is required to complete a half-wave when added to the optical thickness of said one layer and said other layer respectively at the periphery and the centre respectively of the surface of the substrate.

Thus, the invention provides for the first time the possibility of making an interference filter, such as a notch filter, which is effective in parts of the electromagnetic spectrum such as the infra-red region which are otherwise difficult to cover in view of the scarcity of suitable materials for use in designs of conventional type. Conveniently, zinc selenide and zinc sulphide can be used if the filter is to be used to achieve narrow band reflection at 10.6 microns. Narrow band reflection at this wavelength is particularly difficult to achieve satisfactorily using conventional techniques in view of the scarcity of materials having the required refractive index in this region of the spectrum.

The invention provides additional increased scope in all spectral regions for matching the exact bandwidth requirement with that which can be theoretically designed i.e. it is not limited to quantum changes in bandwidth achieved by using different refractive indices of available materials or by changing the order of the reflection harmonic.

Preferably, an anti-reflection layer or layers is added to the interference filter according to the invention, which layer or layers may conveniently comprise or include thorium fluoride.

For an understanding of the priniples of the invention, reference is made to the following examples and drawings in which:

DESCRIPTION OF THE PREFERRED EMBODIMENT

Example 1

Figure 1:
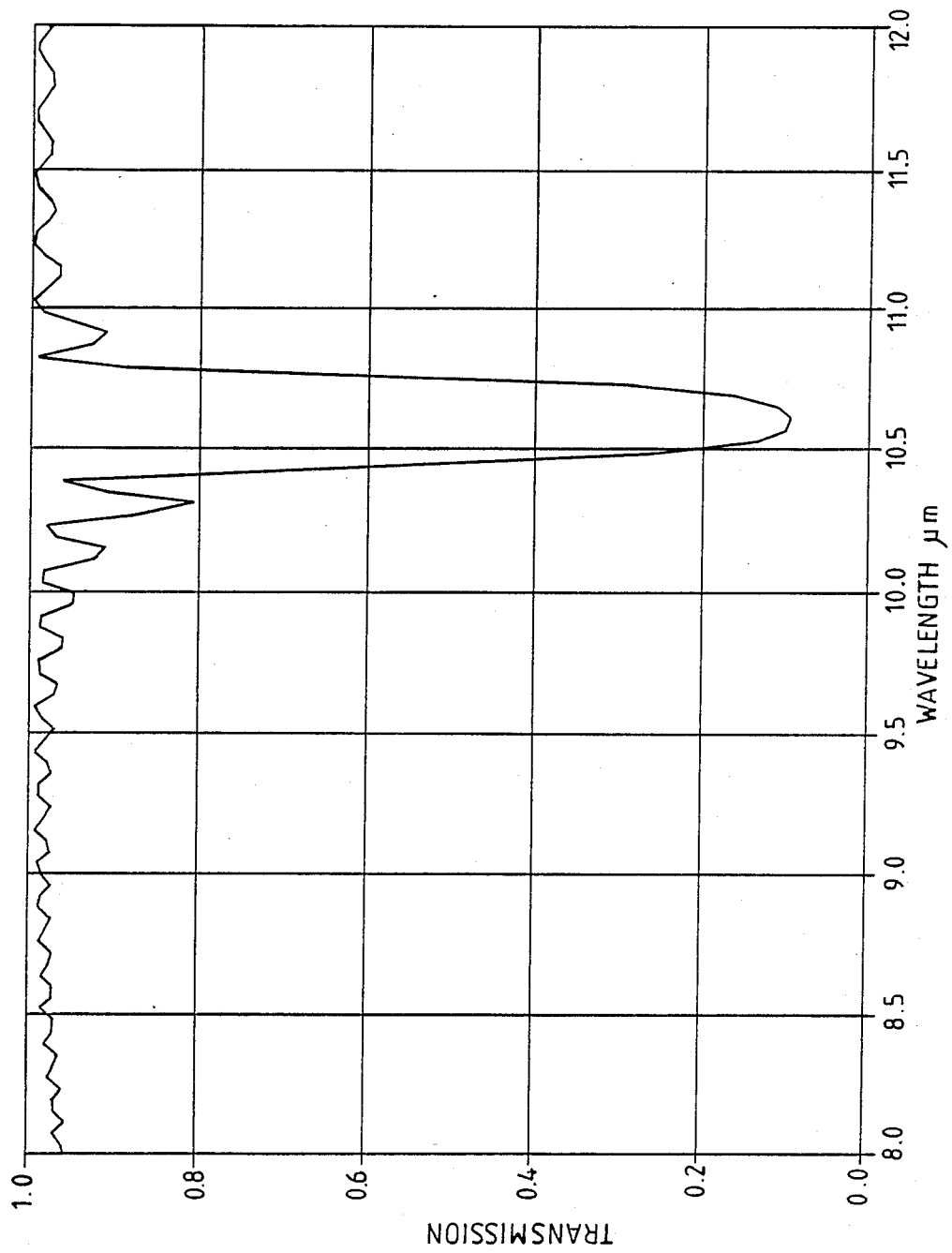
FIG. 1 shows the spectral transmission characteristics of a theoretical filter made in accordance with the first example.

The example shown in the drawing has the construction:

Air/0.336A,0.2,0.336A,(0.32C 1.68B)×56, 0.32C/zinc selenide substrate where it is understood that A, B and C represent, respectively, quarter-wavelength thickness layers, at a reference wavelength of 10.6 microns, of thorium fluoride, zinc selenide and zinc sulphide respectively. Thus, the first layer next to Air is a layer of thorium fluoride of thickness $$\frac{0.336 \times 10.6}{4 \times 1.35} = 0.6596 \text{ microns}$$

since the refractive index of thorium fluoride at 10.6 microns is 1.35, and so on.

The designation "x 56" indicates a multilayer stack of 112 layers (or 56 layer pairs) each layer being constructed in the manner indicated between the brackets. The first three layers in this construction are used for anti-reflection purposes.

In the drawing there is shown the spectral characteristics of a filter constructed in accordance with the above example. It will be seen that a sharp dip or notch is present in transmission of the filter around the 10.6 micron region. This in turn means that in this region of the spectrum the filter effectively reflects most of the electromagnetic radiation and achieves narrow band reflection as required, but without using a conventional quarter-wave design. Indeed, the design of the filter is anything but quarter-wave in design, although each layer pair still adds up to a total half-wave thickness or multiples thereof. The design of the filter made in accordance with Example 1 thus achieves a theoretical reflection efficiency in excess of 90% within a band width of less than about 2.3% of the reference wavelength of 10.6 microns. Additional layers can be used to increase the peak reflectivity above 90%, and the layer thicknesses can be adjusted to reduce the bandwidth, if desired.

Example 2

A second example in accordance with the invention has the construction:

Air/A,0.42B,0.164A,(1.948B,0.052A)×41/zinc selenide substrate where it is understood that A and B represent, respectively, quarter-wavelength thickness layers at a reference wavelength of 10.6 microns, of thorium fluoride and zinc selenide. A filter made in accordance with this example theoretically possesses similar optical performance characteristics to that of the first example and, once again, the first three layers in the design construction are also anti-reflection layers.

Example 3

A third example has the construction:

Air/A,0.424B,0.164A(1.92B,0.08C)×47/zinc selecnide substrate, where it is understood that A, B and C represent, respectively, quarter-wavelength thickness layers at a reference wavelength of 10.6 microns of thorium fluoride, zinc selenide and lead fluoride. This filter also possesses similar theoretical optical performance characterists to that of the first and second examples and, once again, the first three layers in the design construction are anti-reflection layers.

In the application of the technique to the design of multi-layer interference filters to glass lenses, for instance, which have a curved surface, the angular range of protection required at the centre of the lens, in relative close proximity to the eye, is often less than that towards the periphery. Accordingly this means that the bandwidth of the filter in the centre of the lens need not be as great as that at the periphery. Therefore, by controlling the bandwidth of the filter to correspond closely to that required at any point on the surface of the lens ensures that the integrated visible transmission is maximised, particularly in the centre of the lens where high transmission is most important while maintaining full angular protection at the lens periphery where transmission is less critical.

By employing deposition of multi-layers by vacuum evaporation across the curved surface of a lens to a prescribed thickness profile it is possible to provide a reflection notch filter whose bandwidth varies as a function of position on the lens surface.

The bandwidth at any particular point on the surface of the lens will be the minimum required to achieve the specified angular protection thereby ensuring the maximum integrated visible transmission.

In construction, one layer of a layer pair is arranged to progressively increase in thickness and the other layer of the layer pair is arranged to progressively decrease in thickness from the centre to the periphery of the lens. At the thicker portion of any layer, either at the centre or periphery of the lens, the thickness is greater than a quarter-wave and less than a half-wave optical thickness. At the thinner portion of any layer, at the centre or periphery of the lens, the thickness is equal to an optical thickness which is required to complete a half-wave when added to optical thickness of the other layer of a pair at an adjacent position thereof. Consequently the optical thickness of a layer pair at all points across the lens surface is always equal to a half-wave although their relative thicknesses vary between each point.

Figure 2:
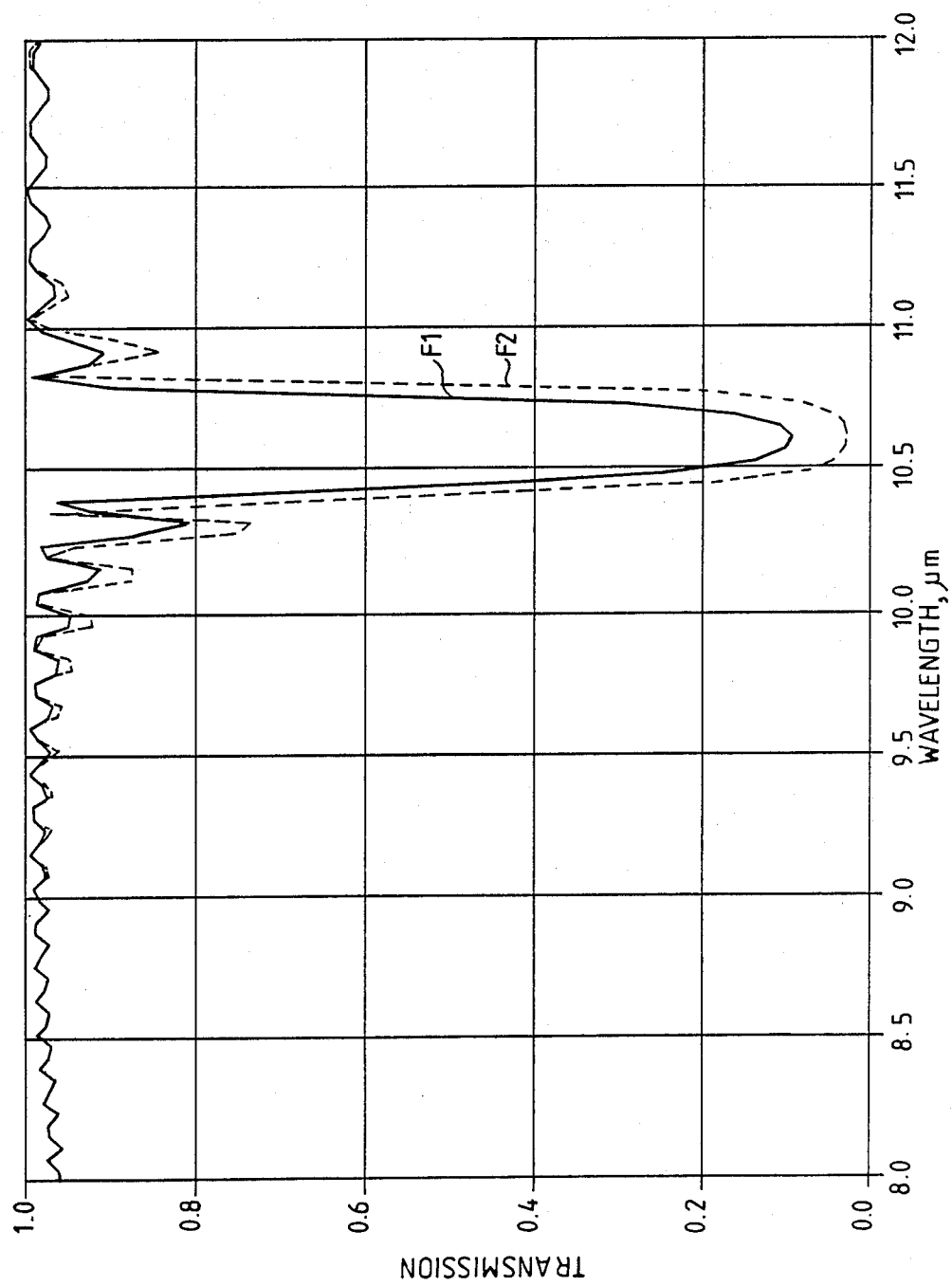
FIG. 2 shows the spectral transmission characteristic of a 10.6 micron reflection notch at two different points on the surface of an optical component.
Figure 3:
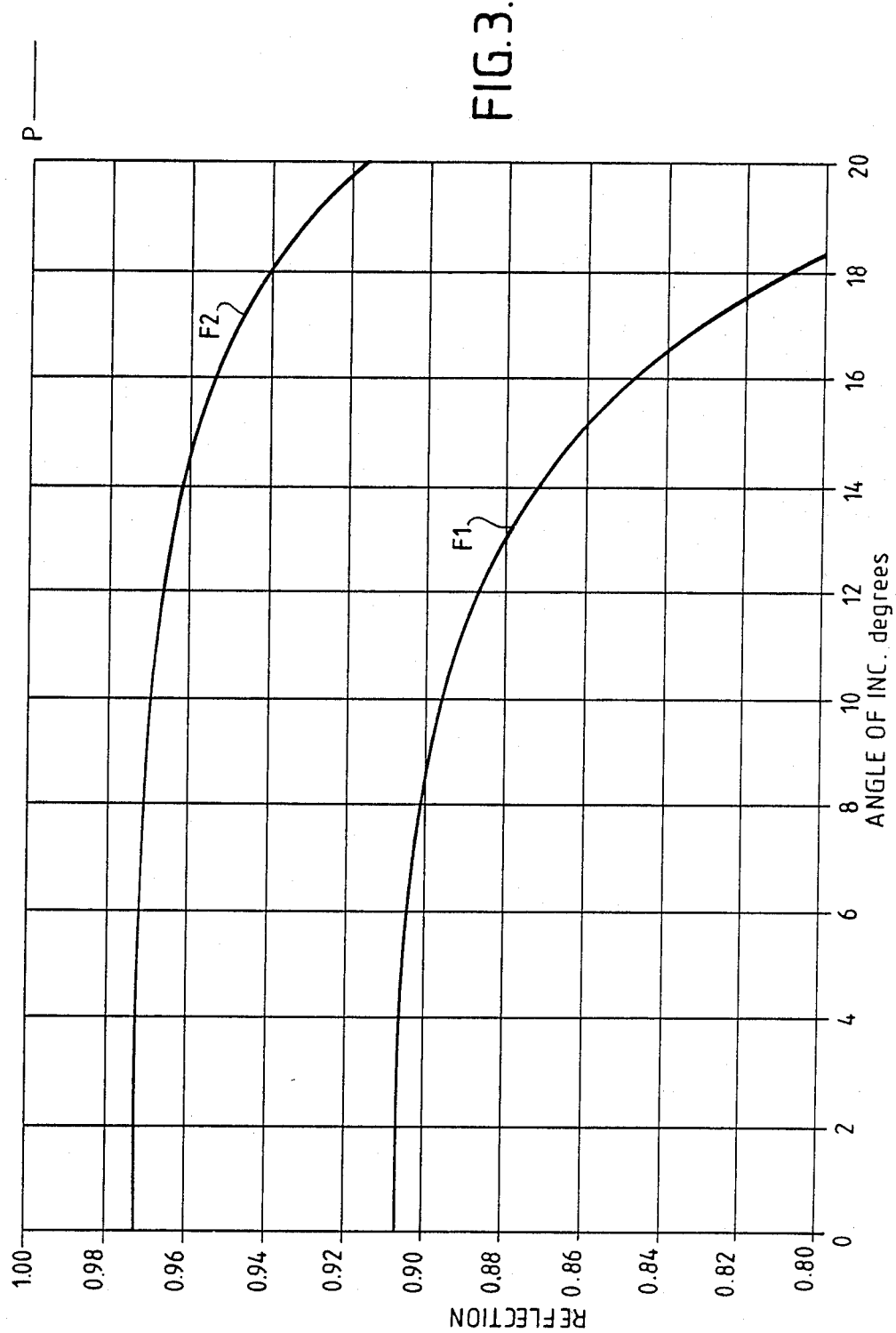
FIG. 3 shows where the reflectivity for p-polarised light has been computed as a function of incidence angle at a wavelength of 10.6 microns.

Thus the bandwidth of the reflection notch is made to match the requirements of different angular coverages at different points on the surface of the component, ensuring the maximum possible integrated transmission. For ease of comparison with FIG. 1, FIG. 2 shows the transmission characteristic of a 10.6 micron reflection notch at two different points on the surface of an optical component. It should be understood, that while this illustrates the performance of a filter at 10.6 microns, the same interference notch principles apply to other regions of the electromagnetic spectrum, and in particular, for example, the visible wavelength region. The narrower notch F1 gives an angular coverage of 0° to 8° at the 90% reflection level, and the wider notch F2, a corresponding coverage of 0° to 21°. This is illustrated in FIG. 3 where the reflectivity for p-polarised light has been computed as a function of incidence angle at a wavelength of 10.6 microns for F1 and F2. It should be noted that in FIG. 1 and FIG. 2 the co-ordinates are, fractional transmission and wavelength (microns). In FIG. 3 the co-ordinates are fractional reflectance and angle of incidence (degrees).

Figure 4:
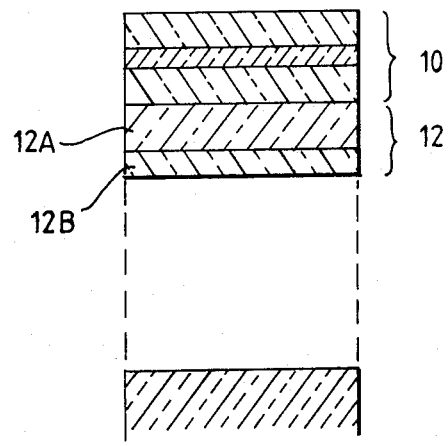
FIG. 4 is a partial cross section through part of a filter in accordance with the invention; and, FIG. 5 is a partial cross section through a filter formed on a curved substrate.
Figure 5:
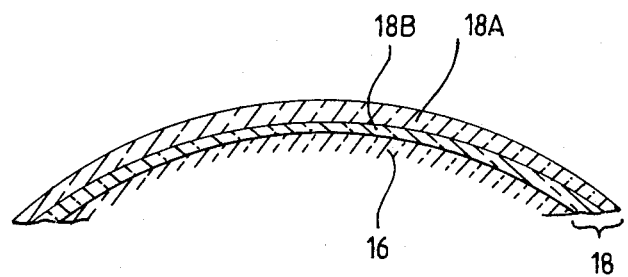

Examples of filters in accordance with the invention are illustrated in FIGS. 4 and 5. Referring to FIG. 4, a typical multiple layer coating comprises a first 3-layer group 10 constituting an anti-reflection coating, and a plurality of half-wave layer pairs generating a transmission characteristic of the type shown in FIG. 1, of which only one layer pair 12 is shown in FIG. 4. Each layer pair 12 comprises two layers 12A, 12B, each representing degraded quarter-wave layers, one having an optical thickness greater than the quarter wavelength and the other having an optical thickness than one quarter wavelength. The substrate is shown by reference numeral 14.

A curved substrate 16 is shown diagrammatically in FIG. 5, having a single layer pair 18, of which outer layer 18A decreases in thickness from the center of the substrate to the periphery, which the inner layer 18B increases in thickness in the same direction, the total optical thickness of the layer pair being maintained at a half wavelength.

Other filters which use different materials operable in the infra-red region of the spectrum, such as germanium, lead telluride and cadmium sulphide can be designed using the techniques in accordance with the teaching of the invention. Indeed the same techniques can be used for other wavelength regions such as the visible portion of the electro-magnetic spectrum, using materials such as titanium dioxide, zirconium oxide, silicon dioxide, and aluminium oxide or other materials suitable for this spectral region.

Using this design technique in accordance with the teaching of the invention has the advantage of greatly extending design flexibility, since a range of bandwidths can be covered which are not limited by the refractive index ratio. The total thickness of the filter, as compared to a conventional quarter-wave design, may also be reduced by about 25% which in turn means that the time taken to deposit the layers is reduced. Furthermore, since one material can be made significantly thinner than the other in each layer pair it follows that the most absorbing or scattering layer material in the design can be chosen as the thin layer. In addition, when it is required to achieve extremely narrow band reflection, say of the order of 1%, the use of higher order stacks is often precluded because of the consequential appearance of other reflection harmonics in regions close to the desired reflection spike, where high transmission is required. Such harmonics can be suppressed by known design techniques, but this adds greatly to the complexity of the filter. Using the design technique in accordance with the invention, no such undesirable harmonics appear in regions close to the desired reflection spike.

The invention is particularly useful in the infra-red region of the spectrum, where materials of suitable refractive index are scarce anyway, and especially if the filter is to be used to reflect incoming laser light such as in the 10.6 micron region of the spectrum. Normally, quarter-wave thickness designs can be prone to thermal damage as a result of discontinuities in the standing wave electric field intensity profile when exposed to intense laser radiation. However, the design in accordance with the invention can, by the use of relatively thin layers and layers with refractive indices close to each other, reduce the standing wave electric field intensity profile discontinuities and hence increase the laser damage threshold.

In addition to the foregoing, it is possible to evolve a design in accordance with the teaching of the invention whereby the problems associated with optically "matching" the multi-layer filter to the surrounding media are minimised. With conventional design techniques an intense reflection ripple pattern inevitably occurs in wavelength regions close to and either side of the main reflection spike of a conventional quarter-wave stack. Such a reflection ripple detracts from the transmission performance of a conventional filter and can be difficult to remove by heretofore known design techniques. However, the present invention has the further advantage in that if a material is chosen for the layer with thickness just less than a half wave optical thickness such that the layer possesses a refractive index close to or equal that of the substrate refractive index, then the reflection ripple will be negligible in amplitude and transmission can be increased simply using a conventional, simple anti-reflection coating of the same design as would normally be used for the substrate material without the interference filter being present.

It will be apparent that the invention provides a significant step forward in the design and construction of interference filters and although the invention has been exemplified above it will also be apparent that other forms of filter can be constructed as required without departing from the spirit or scope of the present invention.

What is claimed is:

1. An interference bandstop filter comprising in combination;
   a light transmitting substrate; and,
   at least one pair of high and low index of refraction light transmitting layers on said light transmitting substrate, the or each layer pair reflecting at least part of a certain wavelength band within a given wavelength range while transmitting other wavelength bands of the said range, each layer of the or each layer pair being a non quarter-wave unequal thickness with respect to its complementary layer, and each layer pair having an optical thickness adding up in total to a half-wave thickness.

2. An interference filter as claimed in claim 1, wherein the light transmitting substrate comprises a material zinc selenide.

3. An interference filter as claimed in claim 2, wherein the light transmitting substrate is a plane surface.

4. An interference filter as claimed in claim 3, wherein the interference filter includes at least one anti-reflection layer.

5. An interference filter as claimed in claim 4, wherein the anti-reflection layer or layers include a material thorium fluoride.

6. An interference filter as claimed in claim 5, wherein the or each layer pair comprises a first layer of zinc selenide and a second layer of zinc sulphide.

7. An interference filter as claimed in claim 6, wherein the or each layer pair comprises a first layer of zinc selenide and a second layer of lead fluoride.

8. An interference filter as claimed in claim 2, wherein the light transmitting substrate is a curved surface.

9. An interference filter as claimed in claim 8, wherein the interference filter includes at least one anti-reflection layer.

10. An interference filter as claimed in claim 1, wherein one layer of the or each layer pair progressively increases in thickness from the centre to the periphery of the surface of the substrate, whereas the other layer of the or each layer pair progressively decreases in thickness from the centre to the periphery of the surface of the substrate.

11. An interference filter as claimed in claim 10, wherein the thickness of said one layer and said other layer at the periphery and the centre respectively of the surface of the substrate is greater than a quarter-wave and less than a half-wave optical thickness, whereas the thickness of said other layer and said one layer at the periphery and centre respectively of the surface of the substrate is equal to an optical thickness which is required to complete a half-wave when added to the optical thickness of said one layer and said other layer respectively at the periphery and the centre respectively of the surface of the substrate.

12. An interference filter as claimed in claim 11, wherein the light transmitting substrate comprises a curved surface and is constituted by a lens.

13. An interference filter as claimed in claim 12, wherein the lens comprises glass.

14. An interference filter as claimed in claim 13, wherein the interference filter includes at least one anti-reflection layer.

15. An interference filter as claimed in claim 14, wherein the anti-reflection layer or layers include a material thorium fluoride.

16. An interference filter as claimed in claim 15, wherein the or each layer pair comprises a first layer of zinc selenide and a second layer of zinc sulphide.

17. An interference filter as claimed in claim 16, wherein the or each layer pair comprises a first layer of zinc selenide and a second layer of lead fluoride.

* * * * *